(12) United States Patent
Chiang et al.

(10) Patent No.: US 10,788,662 B2
(45) Date of Patent: Sep. 29, 2020

(54) PORTABLE SURFACE FINISHING DEVICE BASED ON COHERENT LIGHT SOURCE

(71) Applicant: NATIONAL TSING HUA UNIVERSITY, Hsinchu (TW)

(72) Inventors: An-Chung Chiang, Hsinchu (TW); Yu-Chieh Lin, Hsinchu County (TW); Yen-Yin Lin, Hsinchu (TW); Yuan-Yao Lin, Kaohsiung (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 160 days.

(21) Appl. No.: 16/116,945

(22) Filed: Aug. 30, 2018

(65) Prior Publication Data

US 2019/0339512 A1   Nov. 7, 2019

(30) Foreign Application Priority Data

May 2, 2018 (TW) .............................. 107114922 A

(51) Int. Cl.
*G02B 26/10* (2006.01)
*G02B 5/09* (2006.01)
*G02B 26/08* (2006.01)
*G02B 19/00* (2006.01)
*H02P 7/20* (2006.01)
*G02B 27/30* (2006.01)
(Continued)

(52) U.S. Cl.
CPC ............. *G02B 26/105* (2013.01); *G02B 5/09* (2013.01); *G02B 19/0009* (2013.01); *G02B 19/0047* (2013.01); *G02B 26/0816* (2013.01); *G02B 27/30* (2013.01); *H02P 7/20* (2013.01); *H01S 3/067* (2013.01); *H01S 3/11* (2013.01)

(58) Field of Classification Search
USPC ....................................................... 359/221.3
See application file for complete search history.

(56) References Cited

U.S. PATENT DOCUMENTS

| 1,992,828 | A | * | 2/1935 | La Hodny | ................. | B60R 1/04 |
| | | | | | | 248/483 |
| 3,944,323 | A | * | 3/1976 | Starkweather | ........... | G02B 5/09 |
| | | | | | | 359/215.1 |

(Continued)

FOREIGN PATENT DOCUMENTS

| CN | 104508536 A | 4/2015 |
| CN | 106735887 A | 5/2017 |

(Continued)

*Primary Examiner* — Rodney E Fuller
(74) *Attorney, Agent, or Firm* — CKC & Partners Co., LLC

(57) ABSTRACT

A portable surface finishing device based on coherent light source includes a cover, a laser source, an optical calibrating module and a laser scanning module. The cover includes a beam output opening. The laser source is disposed in the cover, and is for providing a laser beam. The optical calibrating module is disposed in the cover, and the laser beam passes through the optical calibrating module. The laser scanning module is disposed in the cover, and the laser beam from the optical calibrating module passes through the laser scanning module so as to linearly output on a target surface. The laser scanning module includes a multifaceted reflective structure, a rotation driving mechanism and an F-theta lens.

14 Claims, 8 Drawing Sheets

(51) Int. Cl.
*H01S 3/11* (2006.01)
*H01S 3/067* (2006.01)

(56) References Cited

U.S. PATENT DOCUMENTS

| | | | | |
|---|---|---|---|---|
| 5,052,767 | A * | 10/1991 | Sugata | G02B 13/00 359/206.1 |
| 5,153,767 | A * | 10/1992 | Makino | G02B 13/0005 359/206.1 |
| 5,293,266 | A * | 3/1994 | Kohsaka | G02B 26/121 310/51 |
| 5,570,183 | A * | 10/1996 | Wiles | G01B 11/30 250/235 |
| 5,867,298 | A | 2/1999 | Harrigan et al. | |
| 6,008,925 | A * | 12/1999 | Conemac | G02B 26/122 359/204.1 |
| 6,023,059 | A * | 2/2000 | Blanding | G02B 5/09 250/234 |
| 6,515,782 | B1 * | 2/2003 | Harrigan | G02B 13/0005 359/206.1 |
| 9,097,899 | B2 | 8/2015 | Krueger et al. | |
| 2007/0245956 | A1 * | 10/2007 | Ruuttu | C23C 14/0611 118/620 |
| 2008/0170291 | A1 | 7/2008 | Nakamae et al. | |
| 2009/0176034 | A1 * | 7/2009 | Ruuttu | B23K 26/364 427/566 |
| 2011/0259862 | A1 * | 10/2011 | Scott | B23K 26/082 219/121.73 |
| 2015/0300810 | A1 * | 10/2015 | Fojtik et al. | G01B 11/105 356/635 |
| 2016/0184017 | A1 * | 6/2016 | Chlon | A61B 18/203 606/9 |
| 2018/0136458 | A1 * | 5/2018 | Plucinski | G02B 26/101 |

FOREIGN PATENT DOCUMENTS

| | | |
|---|---|---|
| EP | 0329438 A1 | 8/1989 |
| JP | 2018065186 A | 4/2018 |
| TW | 201107068 A1 | 3/2011 |
| TW | 201630679 A | 9/2016 |

* cited by examiner

PORTABLE SURFACE FINISHING DEVICE BASED ON COHERENT LIGHT SOURCE

RELATED APPLICATIONS

This application claims priority to Taiwan Application Serial Number 107114922, filed May 2, 2018, which is herein incorporated by reference.

BACKGROUND

Technical Field

The present disclosure relates to a surface finishing device. More particularly, the present disclosure relates to a portable surface finishing device based on a coherent light source.

Description of Related Art

Coherent light is commonly applied in surface finishing tools of different fields in modern days. The coherent light source has better optical properties and spectral density compared to general light source, and is non-contact and remote-controllable. Specifically, high-power laser is a common coherent light, and is widely applied in tools of cutting, soldering and surface cleaning. Further, $CO_2$ laser or Nd:YAG laser is usually used for surface finishing in all the fields. However, the volume of the laser source of said laser is huge and the power consumption is high which would lead to severely limited application of the said laser.

Therefore, developing an optical surface finishing device which is miniaturized and convenient to carry and has low power consumption and high processing efficiency and quality has become an object of effort in related academic community and industry.

SUMMARY

According to one aspect of the present disclosure, a portable surface finishing device based on coherent light source includes a cover, a laser source, an optical calibrating module and a laser scanning module. The cover includes a beam output opening. The laser source is disposed in the cover, and is for providing a laser beam. The optical calibrating module is disposed in the cover, wherein the laser beam passes through the optical calibrating module. The laser scanning module is disposed in the cover, wherein the laser beam from the optical calibrating module passes through the laser scanning module so as to linearly output on a target surface. The laser scanning module includes a multifaceted reflective structure, a rotation driving mechanism and an F-theta lens. The multifaceted reflective structure is for reflecting the laser beam from the optical calibrating module. The rotation driving mechanism is connected to the multifaceted reflective structure, and is for driving the multifaceted reflective structure to rotate. The F-theta lens is disposed at the beam output opening of the cover, and is for the laser beam reflected from the multifaceted reflective structure to pass through and focus on the target surface.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
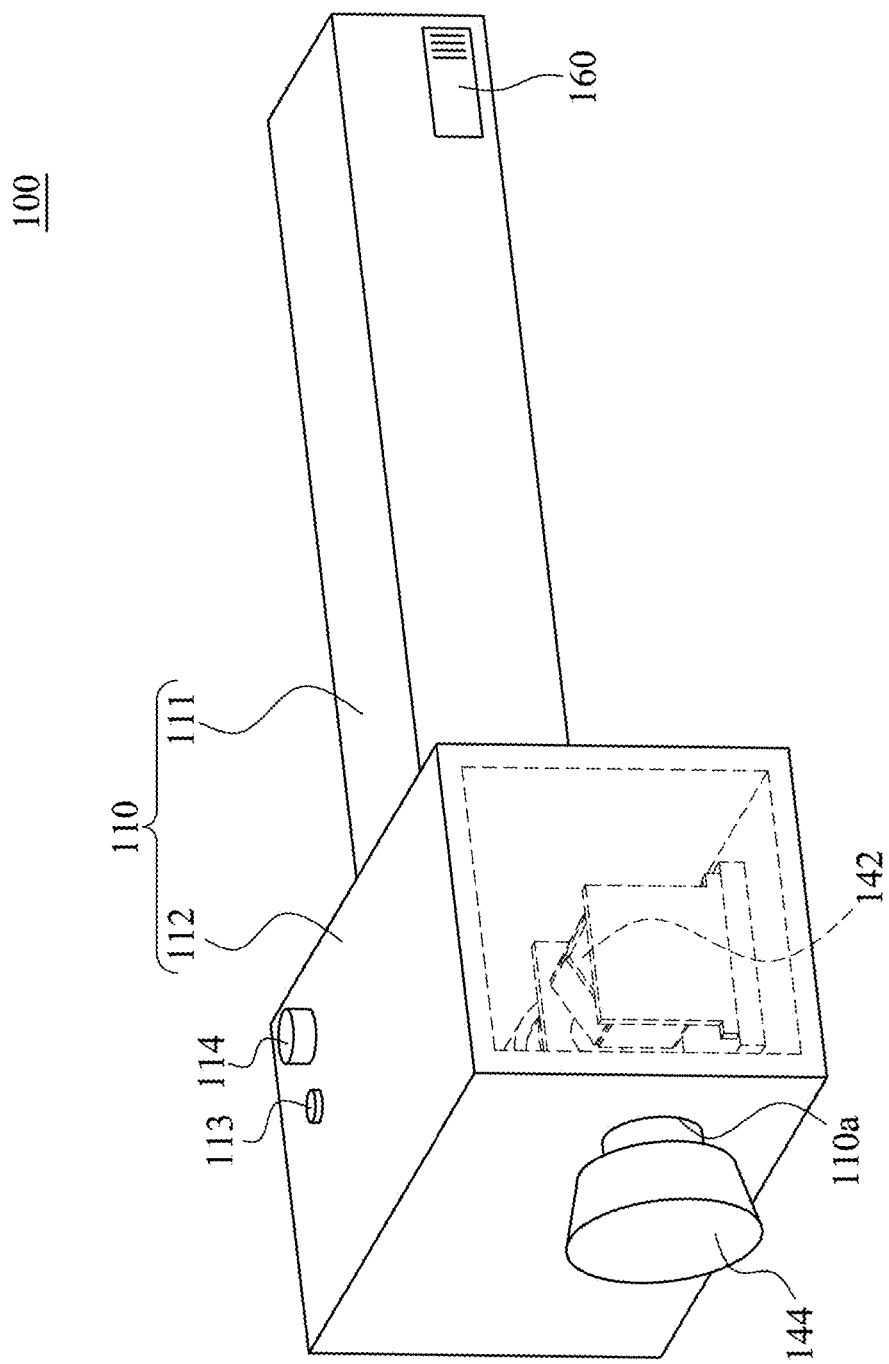
FIG. 1 is a three-dimensional schematic view illustrating a portable surface finishing device based on a coherent light source according to one embodiment of the present disclosure.
Figure 2:
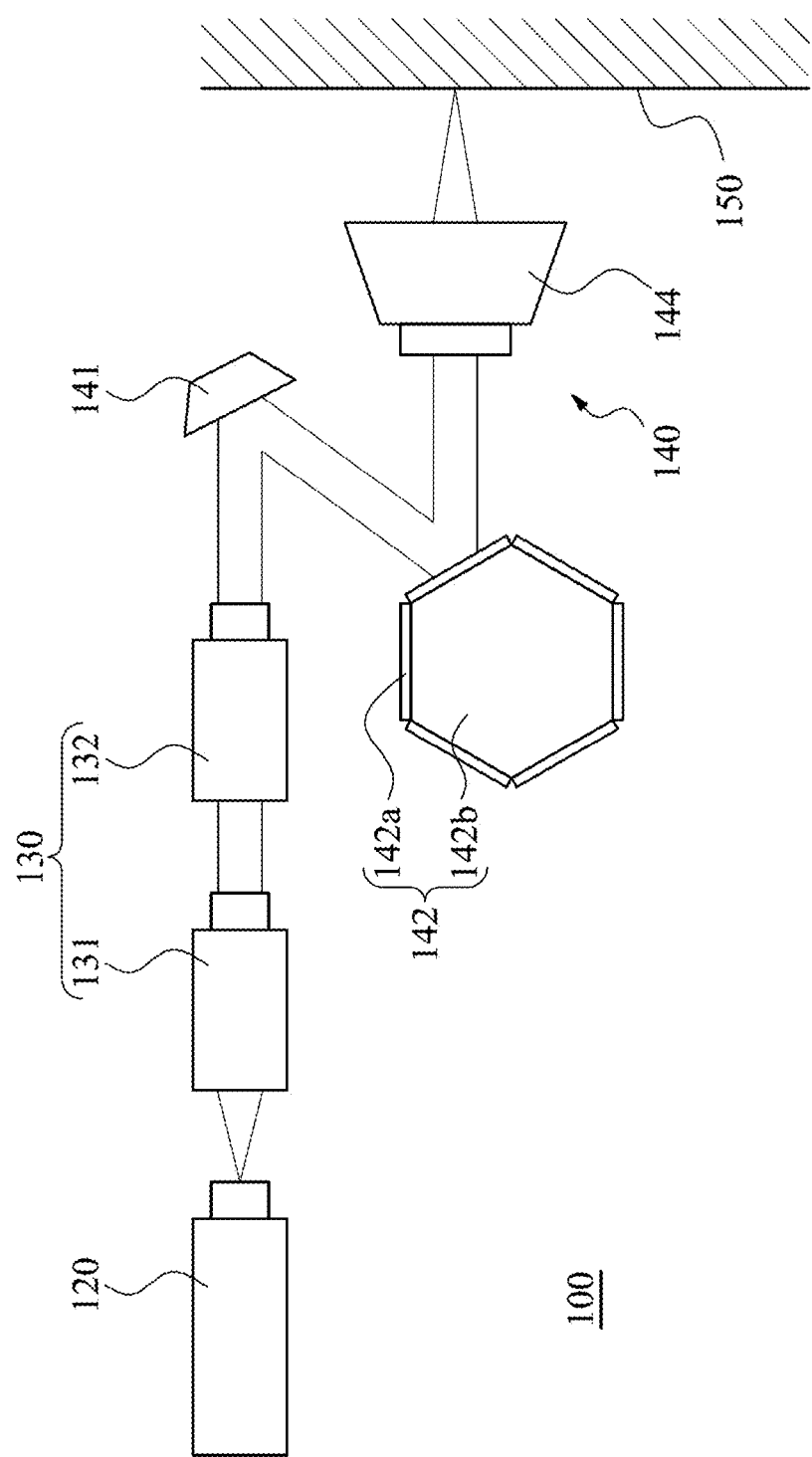
FIG. 2 is a schematic view illustrating the portable surface finishing device based on the coherent light source according to the embodiment of FIG. 1.

FIG. 1 is a three-dimensional schematic view illustrating a portable surface finishing device based on a coherent light source 100 according to one embodiment of the present disclosure. FIG. 2 is a schematic view illustrating the portable surface finishing device based on the coherent light source 100 according to the embodiment of FIG. 1. In FIG. 1 and FIG. 2, the portable surface finishing device based on the coherent light source 100 includes a cover 110, a laser source 120, an optical calibrating module 130 and a laser scanning module 140, wherein the laser source 120, the optical calibrating module 130 and the laser scanning module 140 are disposed in the cover 110.

In detail, the laser source 120 is disposed in the cover 110, and is for providing a laser beam. In the embodiment of FIG. 1, the laser source 120 is an optical fiber laser source, which is a type of non-contact and remote-controllable coherent light. The properties of the light spot of high-power pulsed optical fiber laser source are good and the pulse repetition rate thereof is high, which is favorable for enhancing the quality of surface finishing. Therefore, the overall volume of the portable surface finishing device based on the coherent light source 100 can be reduced, and thus the application thereof is enlarged.

The optical calibrating module 130 is disposed in the cover 110, and is for the laser beam to pass through. In the embodiment of FIG. 1, the optical calibrating module 130 may include a collimator 131 and an isolator 132, wherein the collimator 131 and the isolator 132 are disposed in order along a traveling direction of the laser beam from the laser source 120 beside the laser source 120. The collimator 131 is for restricting the traveling direction of the laser beam. Since the optical fiber laser beam from the laser source 120 is easily scattered, the amount of the laser beam on the target surface 150 will be far less than the amount of the laser beam coming from the laser source 120, and thus the finishing efficiency is reduced. Therefore, via making the laser beam from the laser source 120 pass through the collimator 131, the laser beam can be collimated and travel toward one direction, and thus the finishing efficiency is improved. Furthermore, the isolator 132 is disposed between the laser source 120 and the laser scanning module 140, such that the laser beam through the collimator 131 can enter the isolator 132. Also, via the arrangement of the isolator 132, the situation that the laser beam through the isolator 132 is reflected and re-enters the laser source 120 and interrupts the laser beam coming from the laser source 120 may be prevented. Thus, the optical calibrating module 130 is favorable for improving the efficiency and the quality of surface finishing.

The laser scanning module 140 is disposed in the cover 110, and is for the laser beam from the optical calibrating module 130 to pass through and linearly output on the target surface 150. In other words, surface finishing via the portable surface finishing device based on the coherent light source 100 of the present disclosure is linear scanning of the target surface 150 via the laser beam, and long-striped scanning traces are formed on the target surface 150. The laser scanning module 140 may include a reflector 141, a multifaceted reflective structure 142, a rotation driving mechanism 143 and an F-theta lens 144. The reflector 141 is for reflecting the laser beam from the optical calibrating module 130. The multifaceted reflective structure 142 is for reflecting the laser beam reflected from the reflector 141. The rotation driving mechanism 143 is connected to the multifaceted reflective structure 142 and drives the multifaceted reflective structure 142 to rotate. The F-theta lens 144 is disposed on the beam output opening 110a of the cover 110 and is for the laser beam reflected from the multifaceted reflective structure 142 to pass through and focus on the target surface 150. Since the multifaceted reflective structure 142 is driven to rotate by the motor, when the laser beam hits the multifaceted reflective structure 142, the laser beams reflected from each mirror of the rotating multifaceted reflective structure 142 will be focused by the F-theta lens 144 and linearly output on the target surface 150. The more the mirrors of the multifaceted reflective structure 142 are arranged, the more times the laser beam linearly hit the target surface 150, and the range will be reduced (that is, the lengths of the long-striped scanning traces will be shortened). The F-theta lens in the present disclosure can focus laser beams of different incident angles in specification range on the target surface behind the F-theta lens, hence the laser beams will be effectively focused on every position of the target surface by the F-theta lens after reflected from the rotating multifaceted reflective structure, and thus the surface finishing efficiency can be improved.

Figure 3:
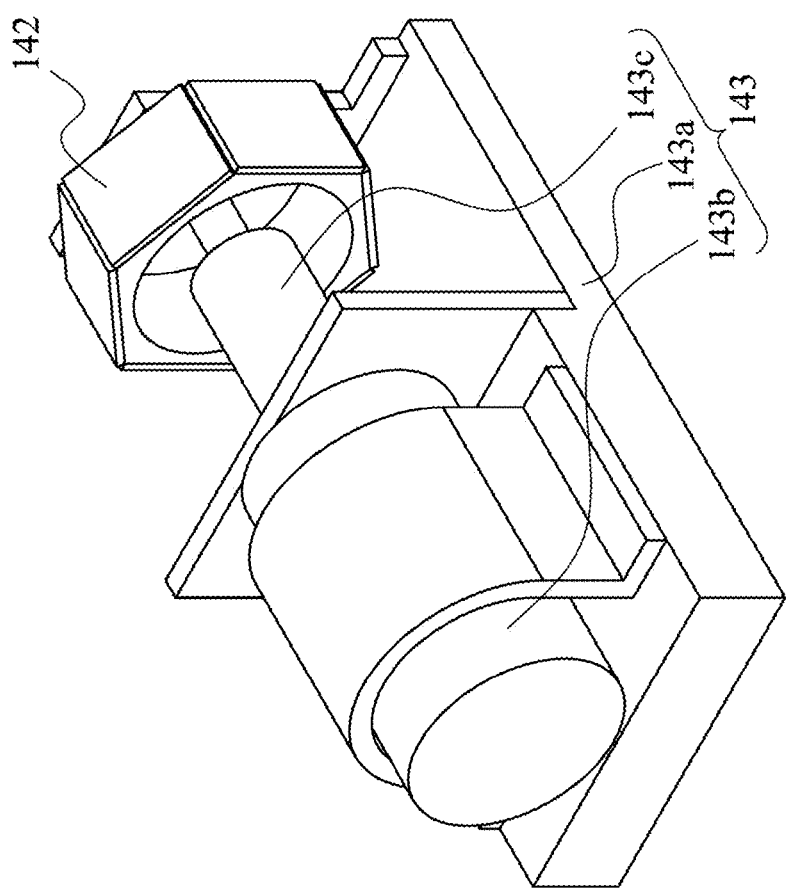
FIG. 3 is a three-dimensional schematic view illustrating a multifaceted reflective structure and a rotation driving mechanism according to the embodiment of FIG. 1.

Please refer to FIG. 3, which is a three-dimensional schematic view illustrating the multifaceted reflective structure 142 and the rotation driving mechanism 143 according to the embodiment of FIG. 1. In FIG. 1, FIG. 2 and FIG. 3, the multifaceted reflective structure 142 may include a polygonal column (its reference numeral is omitted) and a plurality of reflective units (its reference numeral is omitted). The polygonal column has two end surfaces and a plurality of side surfaces, and the rotation driving mechanism 143 is connected to one of the end surfaces, and the plurality of reflective units are connected to the side surfaces of the polygonal column, respectively. Specifically, in the embodiment of FIG. 1, the polygonal column is a right hexagonal prism 142b, the plurality of reflective units are six mirror units 142a, and the right hexagonal prism 142b has two end surfaces (its reference numeral is omitted) and six side surfaces (its reference numeral is omitted), wherein the rotation driving mechanism 143 is connected to one of the end surfaces, and the mirror units 142a are connected to the six side surfaces, respectively. Furthermore, the rotation driving mechanism 143 may include a DC motor 143b which can stably drive the multifaceted reflective structure 142 to rotate in a single direction, such that the laser beams will be focused by the F-theta lens 144 and linearly scan on the target surface 150 after reflected from each of the mirror units 142a of the rotating multifaceted reflective structure 142. The driving direction of the Galvo motor in the conventional scanning galvanometer is a swing mechanism in a left-and-right reciprocating motion, hence the speed of driving mirrors that reflect laser beams is limited and it easily leads to deterioration of the target materials caused by heat accumulation owing to slower speed when clearing impurities on the surface. Moreover, the Galvo motor is higher in cost than the conventional DC motor. Therefore, the arrangement of the DC motor 143b for driving the multifaceted reflective structure 142 in the present disclosure is favorable for improving the speed and quality of surface finishing and reduces the cost of the portable surface finishing device based on the coherent light source.

To further improve the stability of the DC motor 143b driving the multifaceted reflective structure 142 to rotate, the rotation driving mechanism 143 may further include a base 143a and a bearing 143c, wherein the base 143a is for the DC motor 143b and the multifaceted reflective structure 142 to be disposed thereon, the bearing 143c is disposed around the driving head (its reference numeral is omitted) of the DC motor 143b, and the DC motor 143b is connected to the multifaceted reflective structure 142 via the driving head. Therefore, via the arrangement of the base 143a, the DC motor 143b and the multifaceted reflective structure 142 can be firmly disposed on the base 143a. Also, via the arrangement of the bearing 143c, the DC motor 143b can drive the multifaceted reflective structure 142 to rotate more stably. Thus, the influence on the quality of surface finishing when the portable surface finishing device based on the coherent light source 100 is moved or shaken when being used can be prevented.

Moreover, in FIG. 1, the cover 110 of the portable surface finishing device based on the coherent light source 100 may include a holding part 111 and a scanning part 112, wherein the laser source 120, the optical calibrating module 130 and the reflector 141 of the laser scanning module 140 are disposed in the cover 110. Before the laser beam is reflected from the reflector 141, the traveling path is a straight line, hence for the convenience for the user to hold, the holding part 111 may be designed as a cuboid cover. The scanning part 112 is for accommodating the multifaceted reflective structure 142 of the laser scanning module 140, the rotation driving mechanism 143 and the F-theta lens 144, wherein the beam output opening 110a is disposed on one side of the scanning part 112. To accommodate the multifaceted reflective structure 142, the rotation driving mechanism 143 and the F-theta lens 144 and to successfully drive the multifaceted reflective structure 142 to rotate, the overall width of the scanning part 112 will be greater than the overall width of the holding part 111. Therefore, the arrangement of the holding part 111 is favorable for the user to carry and hold, and thus the application of the portable surface finishing device based on the coherent light source 100 can be enlarged. Meanwhile, the volume of the holding part 111 may be less than the volume of the scanning part 112, hence the volume difference is favorable for the overall volume and weight of the portable surface finishing device based on the coherent light source 100 to be reduced, and thus the convenience of using and carrying is improved.

In FIG. 1, the cover 110 may further include a switch 113, which may be disposed on the scanning part 112 of the cover 110 and electrically connected to the rotation driving mechanism 143. Hence, it is convenient for the user to turn on or turn off the rotation driving mechanism 143. The cover 110 may further include a knob 114, which may be disposed on the scanning part 112 of the cover 110 and connected to the rotation driving mechanism 143. The knob 114 is for controlling the rotational speed of the rotation driving mechanism 143 to drive the multifaceted reflective structure 142. As such, it is favorable for enlarging the application of the portable surface finishing device based on the coherent light source 100.

In the embodiment of FIG. 1, the portable surface finishing device based on the coherent light source 100 may further include a battery module 160, which is disposed on the cover 110 and electrically connected to the laser source 120 and the rotation driving mechanism 143 of the laser scanning module 140. The laser source 120 of the present disclose is mainly a fiber laser (the laser power is about tens of watts, and the power consumption is about a hundred watt), and the power of the fiber laser is lower than the power of the conventional high-power carbon dioxide laser (the laser power is about hundreds of watts, and the power consumption is over a thousand watt). Furthermore, the power consumption of the DC motor 143b of the rotation driving mechanism 143 in the embodiment of FIG. 1 is lower than the power consumption of the conventional Galvo motor. Therefore, the power may be supplied via the battery module 160 to the portable surface finishing device based on the coherent light source 100. The battery module 160 may further include a rechargeable battery (not shown), matching with the characteristic of portability of the portable surface finishing device based on the coherent light source 100, and thus the objective of unplugging and miniaturization can be fulfilled. Moreover, the battery of the battery module of the present disclose may further be a DC battery, which can directly supply power to the DC motor and the optical fiber laser without any AC/DC converter. Thus, the overall structure of the portable surface finishing device based on the coherent light source can be simplified and the power consumption can be reduced.

Figure 4:
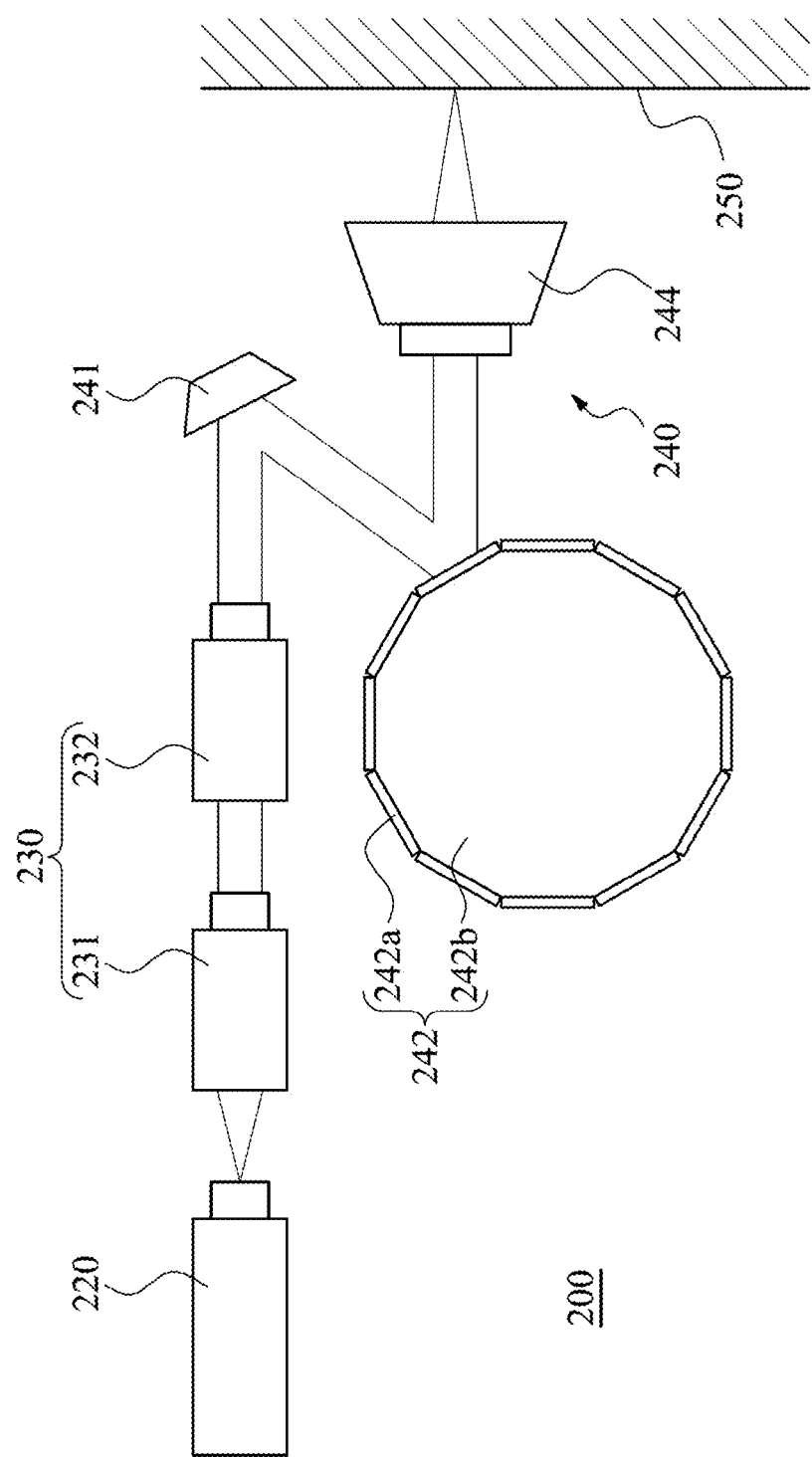
FIG. 4 is a schematic view illustrating a portable surface finishing device based on a coherent light source according to another embodiment of the present disclosure.

Please refer to FIG. 4, which is a schematic view illustrating a portable surface finishing device based on a coherent light source 200 according to another embodiment of the present disclose. In FIG. 4, the portable surface finishing device based on the coherent light source 200 includes a cover (not shown), a laser source 220, an optical calibrating module 230 and a laser scanning module 240, wherein the laser source 220, the optical calibrating module 230 and the laser scanning module 240 are disposed in the cover as in the embodiment of FIG. 1.

In the embodiment of FIG. 4, the optical calibrating module 230 may also include a collimator 231 and an isolator 232, wherein the collimator 231 and the isolator 232 are disposed in order along a traveling direction of the laser beam beside the laser source 220. The collimator 231 is for restricting the traveling direction of the laser beam, and the isolator 232 is for preventing the situation that the laser beam through the isolator 232 is reflected from the surroundings and re-enters the laser source 220 and interrupts the laser beam coming from the laser source 220. The laser scanning module 240 may include a reflector 241, a multifaceted reflective structure 242, a rotation driving mechanism (not shown) and an F-theta lens 244, and the arrangements are the same as in the laser scanning module 140 in the embodiment of FIG. 2 and will not be described again herein.

What is worth mentioning is, in the embodiment of FIG. 4, the polygonal column of the multifaceted reflective structure 242 is a right dodecagonal prism 242b, the plurality of reflective units are twelve mirror units 242a, the right dodecagonal prism 242b has two end surfaces (its reference numeral is omitted) and twelve side surfaces (its reference numeral is omitted), wherein the rotation driving mechanism is connected to one of the end surfaces, and the mirror units 242a are connected to the twelve side surfaces, respectively. Compared to the multifaceted reflective structure 142 in the embodiment of FIG. 2, the multifaceted reflective structure 242 in the embodiment of FIG. 4 includes the dodecagonal prism 242b and the twelve mirror units 242a, and the times of the laser beam through the F-theta lens 244 scans on the target surface 250 will be increased and the lengths of the linear scanning will be reduced.

Specifically, in the embodiment of FIG. 4, the output pulse frequency of the laser source 220 is 60 kHz, and the focal length of the F-theta lens 244 is 63 mm. Please refer to Table 1 below, which lists the voltages of the DC motor (which is mentioned as "motor" in Table 1), the line frequencies of the laser beam, the rotational speeds of the DC motor, the effective processing speeds and the numbers of the laser line pulses.

TABLE 1

| Voltage of the motor(V) | Laser line frequency(kHz) | Rational speed of the motor(RPM) | Effective processing speed(mm/s) | Number of the laser line pulse (/laser line) |
|---|---|---|---|---|
| 6.6 | 1.15 | 5735 | 57350 | 52 |
| 7.3 | 1.21 | 6035 | 60350 | 50 |
| 8.1 | 1.35 | 6745 | 67450 | 44 |
| 8.8 | 1.48 | 7415 | 74150 | 40 |
| 9.6 | 1.58 | 7885 | 78850 | 38 |
| 10.4 | 1.77 | 8850 | 88500 | 34 |

In Table 1 above, the higher the voltage of the motor, the higher the rotational speed of the motor and the higher the line frequency of the laser that the laser beam scans on the target surface 250. Therefore, the effective processing speed (i.e., the range of surface finishing per second) is increased, and the number of the pulses per laser line is decreased. Thus, the average power received per unit area is decreased, and the problem of deterioration of the target materials caused by heat accumulation can be reduced, and the treated target surface can be smoother.

Figure 5:
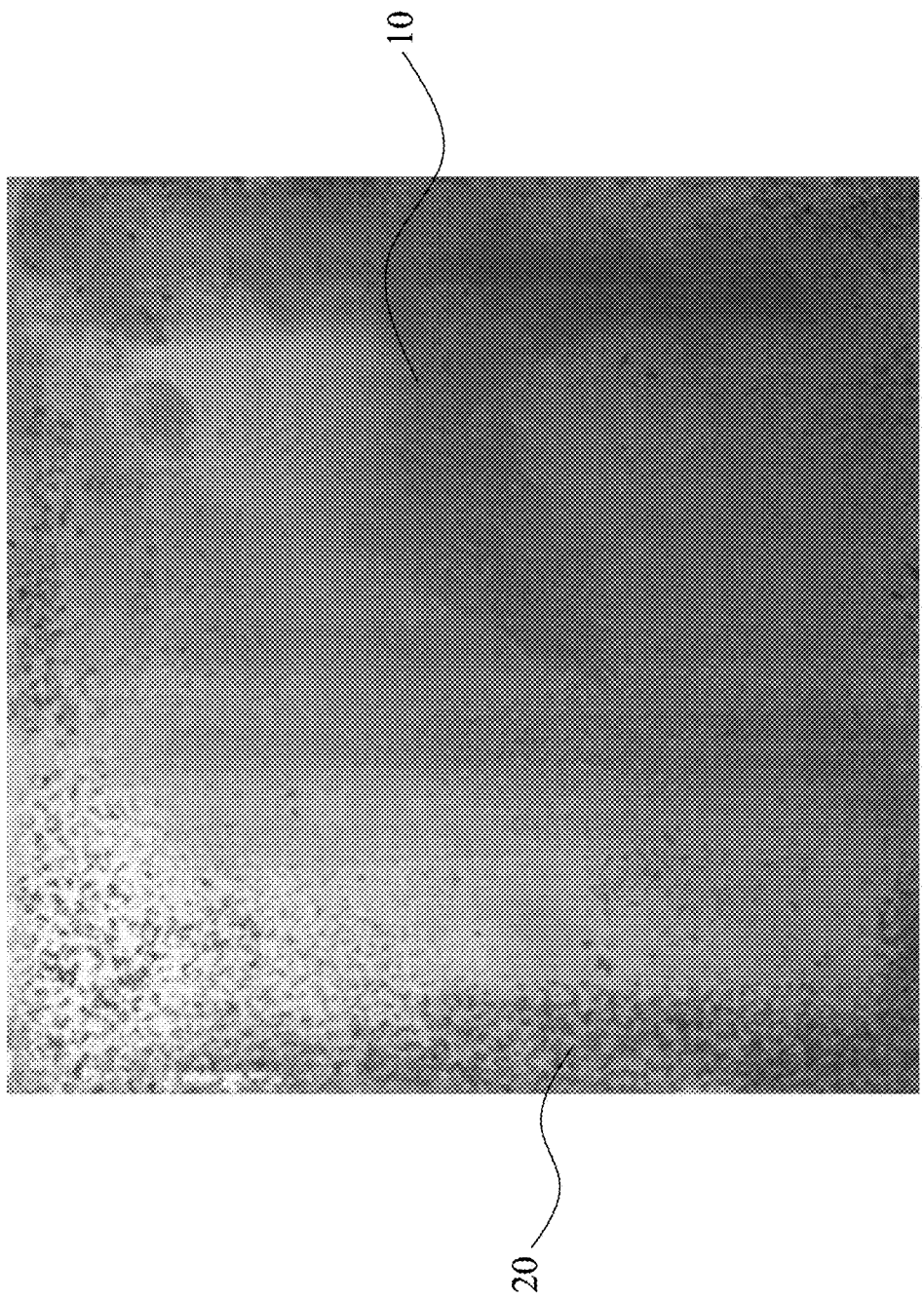
FIG. 5 is a photo of an object after being surface finished by the portable surface finishing device based on the coherent light source according to the embodiment of FIG. 4.

Please refer to FIG. 5, which is a photo of an object after being surface finished by the portable surface finishing device based on the coherent light source 200 according to the embodiment of FIG. 4. In FIG. 5, the area 10 is the treated surface area, and the area 20 is the untreated surface area. Obviously, after being surface finished by the portable surface finishing device based on the coherent light source 200 of the present disclosure, the rusty part of the area 10 is evenly removed, and there is no unevenness and no rust remained on the part. Compared to the untreated area 20, the part of the area 10 has recovers smoothness.

Figure 6:
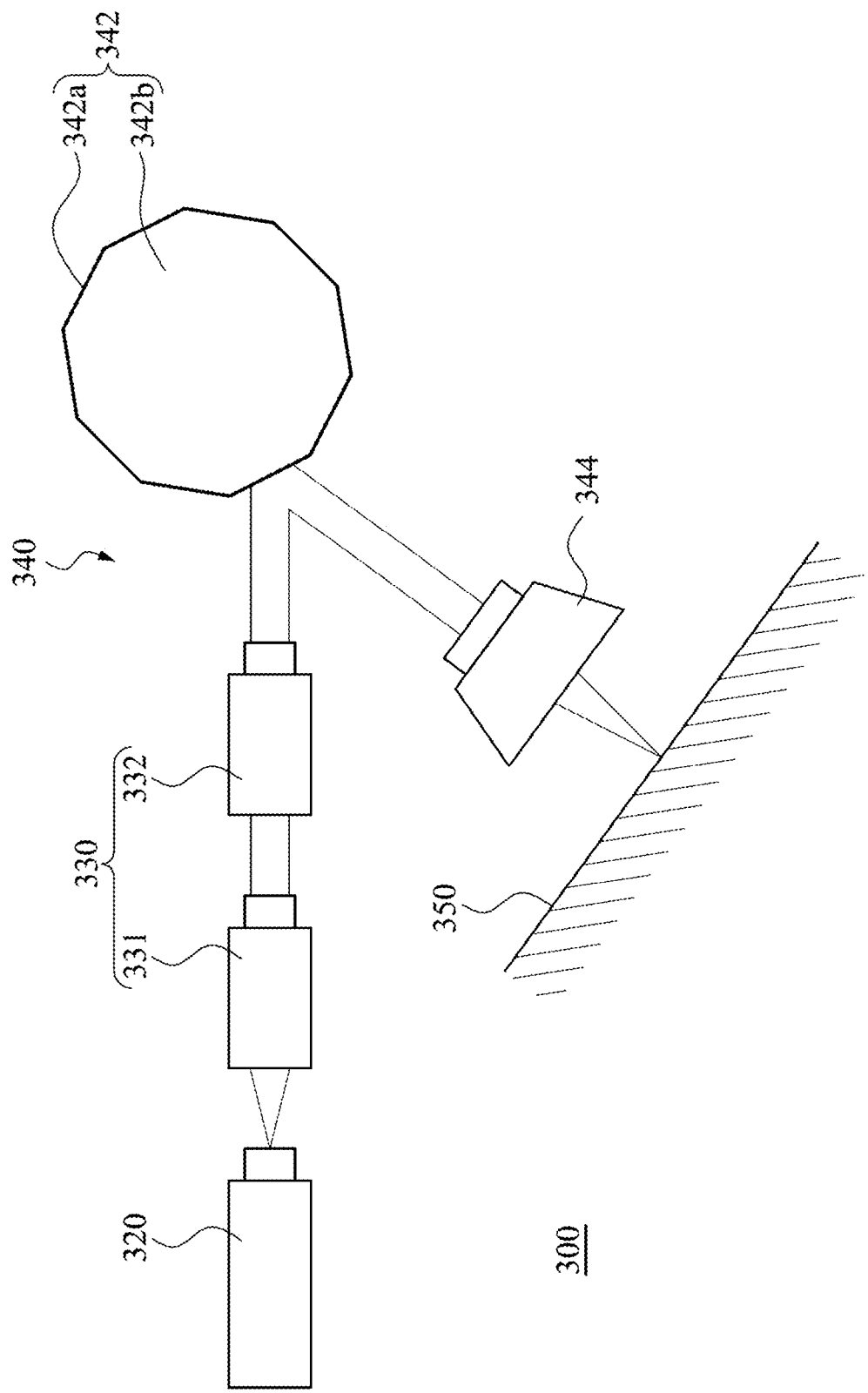
FIG. 6 is a schematic view illustrating a portable surface finishing device based on a coherent light source according to further another embodiment of the present disclosure.

FIG. 6 is a schematic view illustrating a portable surface finishing device based on a coherent light source 300 according to further another embodiment of the present disclosure. In FIG. 6, the portable surface finishing device based on the coherent light source 300 includes a cover (not shown), a laser source 320, an optical calibrating module 330 and a laser scanning module 340, wherein the laser source 320, the optical calibrating module 330 and the laser scanning module 340 are disposed in the cover as in the embodiment of FIG. 1, and the optical calibrating module 330 includes a collimator 331 and an isolator 332. The arrangements of the components are the same as in the embodiment of FIG. 1 and will not be described again herein.

In the embodiment of FIG. 6, the laser scanning module 340 includes a multifaceted reflective structure 342, a rotation driving mechanism (not shown) and an F-theta lens 344. In other words, different from the laser scanning modules 140 and 240 of the portable surface finishing device based on the coherent light sources 100 and 200, in the embodiment of FIG. 6, the laser scanning module 340 does not include a reflector. Before the laser beam hits the multifaceted reflective structure, the reflector can adjust a traveling direction of the laser beam, and the output laser beam can further be adjusted corresponding to the position of the beam output opening of the cover to hit the target surface 350. Thus, whether the reflector is disposed or what angle the reflector is disposed at can both be adaptively adjusted according to the requirements and will not be limited thereto.

In the embodiment of FIG. 6, the multifaceted reflective structure 342 includes a polygonal column and a plurality of reflective units, wherein the polygonal column is a right decagonal prism 342b, and each of the plurality of reflective units is a metal reflective coating layer 342a. The right decagonal prism 342b has two end surfaces (its reference numeral is omitted) and ten side surfaces (its reference numeral is omitted), wherein the rotation driving mechanism (not shown) is connected to an end surface, and the metal reflective coating layers 342a are connected to the ten side surfaces, respectively. As such, when the multifaceted reflective structure 342 is rotating, the reflective units can be prevented from falling off, and thus the stability of connection between the reflective units and the polygonal column can be increased, and the life time of the portable surface finishing device based on the coherent light source can be extended.

Figure 7:
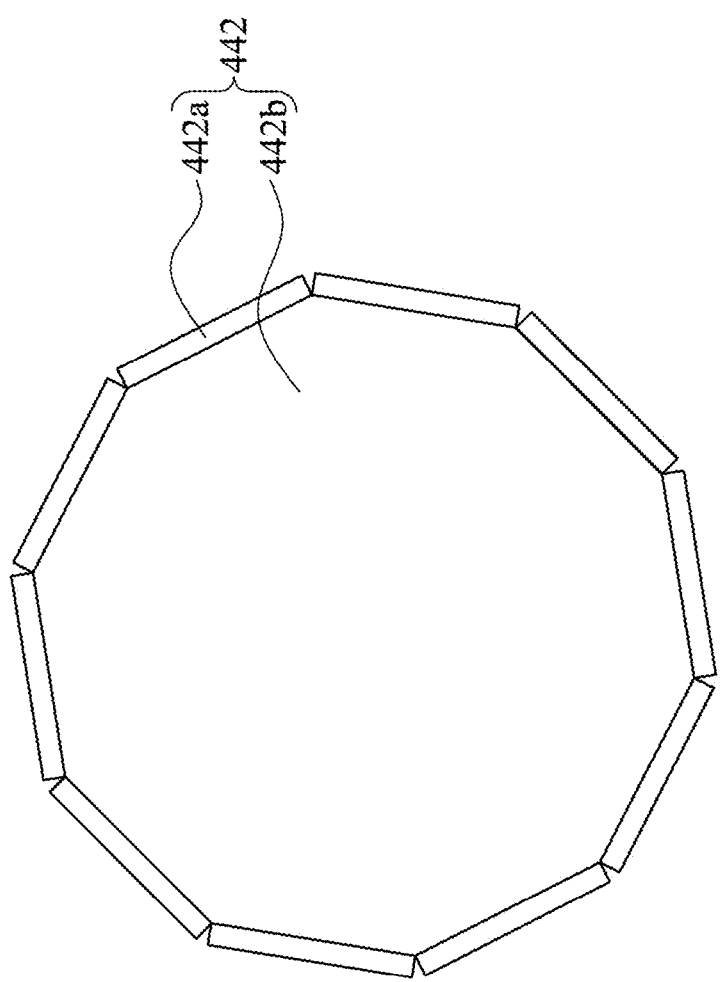
FIG. 7 is a schematic view illustrating a multifaceted reflective structure of a portable surface finishing device based on a coherent light source according to still another embodiment of the present disclosure.

Please refer to FIG. 7, which is a schematic view illustrating a multifaceted reflective structure 442 of a portable surface finishing device based on a coherent light source according to still another embodiment of the present disclosure. In FIG. 7, the polygonal column of the multifaceted reflective structure 442 may be a right decagonal prism 442b, and the plurality of the reflective units may be ten mirror units 442a. Each of the mirror units 442a is connected to the side surfaces of the right decagonal prism 442b, wherein the direction of a normal line (its reference numeral is omitted) of each of the mirror units 442a is the same as the direction of a normal line (its reference numeral is omitted) of each of the side surfaces of the connected right decagonal prism 442b, and thus the directions of the laser beams reflected from each of the mirror units 442a can be the same. As such, the efficiency of surface finishing of certain areas can be improved.

Figure 8:
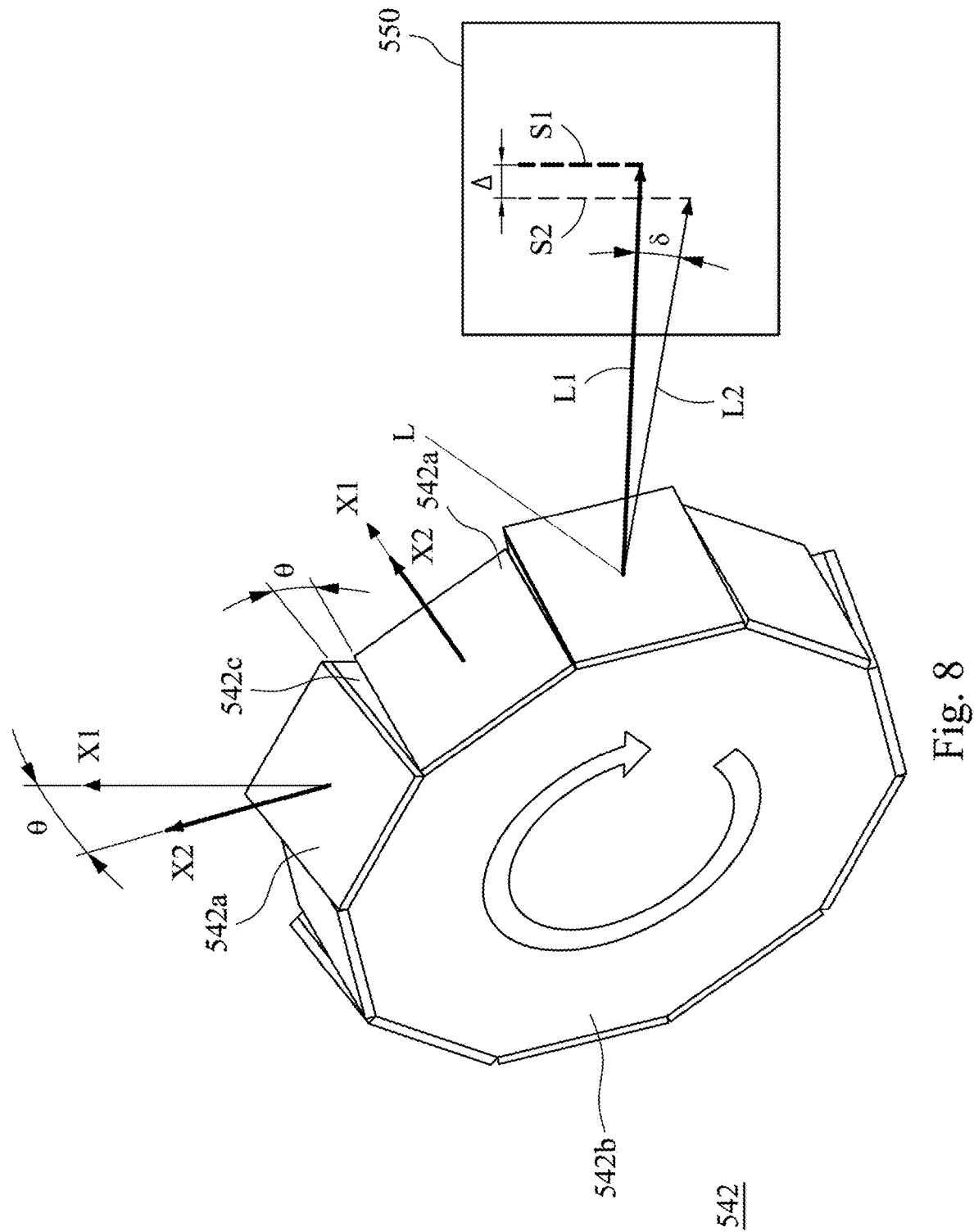
FIG. 8 is a schematic view illustrating a multifaceted reflective structure of a portable surface finishing device based on a coherent light source according to yet another embodiment of the present disclosure.

Please refer to FIG. 8, which is a schematic view illustrating a multifaceted reflective structure 542 of a portable surface finishing device based on a coherent light source according to yet another embodiment of the present disclosure. In FIG. 8, the polygonal column of the multifaceted reflective structure 542 may be a right decagonal prism 542b, and the plurality of the reflective units may be ten mirror units 542a, wherein each of the mirror units 542a is connected to a side surface of the right decagonal prism 542b. Moreover, the multifaceted reflective structure 542 in the embodiment of FIG. 8 further includes at least one connecting structure 542c which connects one of the reflective units to one of the side surfaces of the polygonal column such that the direction of a normal line of the reflective unit is different from the direction of a normal line of the side surface. In the embodiment of FIG. 8, the multifaceted reflective structure 542 includes five connecting structures 542c which connect the mirror units 542a to the side surfaces of the right decagonal prism 542b alternately. In other words, one of the two adjacent mirror units 542a directly connects to one of the side surface of the right decagonal prism 542b, and the other connects to one of the side surface of the right decagonal prism 542b via the connecting structure 542c. Since there is a tilt angle θ between the connecting structure 542c and each of the side surfaces, the direction of a normal line X2 of each of the mirror units 542a is different from the direction of a normal line X1 of the connected right decagonal prism 542b. Without the connecting structure 542c, the direction of the normal line X1 of each of the side surfaces is the same as the direction of the normal line X2 of each of the connected mirror units 542a. As such, when the laser beam L is reflected from the mirror units 542a on the side surfaces disposed with the connecting structure 542c, the reflecting path will be as the light path L2 in FIG. 8, when the laser beam L is reflected from the mirror units 542a on the side surfaces without the connecting structure 542c, the reflecting path will be as the light path L1 in FIG. 8. Moreover, FIG. 8 is a schematic view further illustrating the laser beams of the light paths L1 and L2 pass through the F-theta lens (not shown) and focus on the target surface 550. Due to the connecting structure 542c, the tilt angle between the mirror units 542a and the side surfaces is θ, that is, the difference angle between the normal line X1 and the normal line X2 is θ, hence there will be an angle δ between the laser beams of the light paths L1 and L2, wherein δ=2×θ. The laser beams of the two different light paths through the F-theta lens focusing on the target surface 550 will form two scanning lines S1 and S2, and the distance between the scanning lines S1 and S2 may be Δ, wherein Δ is directly proportional to δ. In other words, as δ approaches zero, Δ will also approach zero and the scanning lines S1 and S2 will almost overlap. Therefore, via adjusting the arrangement angle of the mirror units 542a, the scanning area of the portable surface finishing device based on the coherent light source will be enlarged and will be a two-dimensional scanning, and thus the device is favorable for cleaning a target surface of large area.

Besides, if the connecting structures are applied to different types of multifaceted structures, at least three scanning lines will hit the target surface with the arrangement of at least two tilt angles, and the application of the portable surface finishing device based on the coherent light source of the present disclosure can be enlarged. The present disclosure will not be limited thereto.

It must be noted that the polygonal column of the multifaceted reflective structure in the portable surface finishing device based on the coherent light source of the present disclosure can be prisms of different types or different numbers of side surfaces according to the requirements of application. Also, the polygonal column is not limited to a right polygonal column and may further be other geometric shapes that are reflective. The corresponding number of the reflective units may be adaptively adjusted according to different types of polygonal column and will not be limited thereto. Furthermore, the multifaceted reflective structure may be modular arrangement and replaced according to the requirements of application.

Besides, the caliber and the focal length of the F-theta lens in the portable surface finishing device based on the coherent light source of the present disclosure may be adjusted according to the arrangement of the multifaceted reflective structure. When the number of the reflective units is small, an F-theta lens of larger caliber is required, which can provide larger scanning area but the scanning speed is slower; when the number of the reflective units is large, an F-theta lens of smaller caliber may be used, which can provide faster scanning speed but the scanning area is smaller. Thus, the present disclosure will not be limited thereto.

To conclude, the portable surface finishing device based on the coherent light source of the present disclosure can provide the following advantages:

(1) Via the pulsed optical fiber laser source, which has the characteristic of a high pulse repetition rate and can scan fast with a DC motor; the peak power is high, and thus the efficiency of surface finishing can be improved; the stability of the light spot is high, and the laser beam can output stably and has higher controllability; the volume is small and the power consumption is small, and is favorable for the application of portability.

(2) Via the arrangement of the laser scanning module with the multifaceted reflective structure and matching with the single-direction rotation driving DC motor, the efficiency of surface finishing is improved and the manufacturing cost can be reduced, (3) With the portability, the application can be enlarged. The device can be used in cleaning, decontamination, paint removal, rust removal, film removal and groove removal in industry and is convenient for workers to carry to work fields to process surface finishing, e.g., decontamination of nuclear facilities and rust removal of surfaces of bare reinforcing bars on the construction site.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A portable surface finishing device based on a coherent light source, comprising:
    a cover, comprising a beam output opening;
    a laser source disposed in the cover, and for providing a laser beam;
    an optical calibrating module disposed in the cover, wherein the laser beam passes through the optical calibrating module; and
    a laser scanning module disposed in the cover, wherein the laser beam from the optical calibrating module passes through the laser scanning module so as to linearly output on a target surface, and the laser scanning module comprises:
        a multifaceted reflective structure for reflecting the laser beam from the optical calibrating module, wherein the multifaceted reflective structure comprises:
            a polygonal column having two end surfaces and a plurality of side surfaces, and the rotation driving mechanism is connected to one of the end surfaces;
            a plurality of reflective units connected to the plurality of side surfaces of the polygonal column, respectively; and
            at least one connecting structure connecting one of the reflective units to one of the side surfaces of the polygonal column such that a direction of a normal line of the reflective unit is different from a direction of a normal line of the side surface;
        a rotation driving mechanism connected to the multifaceted reflective structure, and for driving the multifaceted reflective structure to rotate; and
        an F-theta lens disposed at the beam output opening of the cover, and for the laser beam reflected from the multifaceted reflective structure to pass through and focus on the target surface.

2. The portable surface finishing device based on the coherent light source of claim 1, wherein the optical calibrating module comprises a collimator for restricting a traveling direction of the laser beam.

3. The portable surface finishing device based on the coherent light source of claim 1, wherein the optical calibrating module comprises an isolator disposed between the laser source and the laser scanning module.

4. The portable surface finishing device based on the coherent light source of claim 1, wherein,
    the polygonal column is a right hexagonal prism, and a number of the plurality of side surfaces is six; and
    the reflective units are six mirror units, and the mirror units are connected to the six side surfaces, respectively.

5. The portable surface finishing device based on the coherent light source of claim 1, wherein,
    the polygonal column is a right dodecagonal prism, and a number of the plurality of side surfaces is twelve;
    the reflective units are twelve mirror units, and the mirror units are connected to the twelve side surfaces, respectively.

6. The portable surface finishing device based on the coherent light source of claim 1, wherein,
    the polygonal column is a right decagonal prism, and a number of the plurality of side surfaces is ten;
    the reflective units are ten mirror units, and the mirror units are connected to the ten side surfaces, respectively.

7. The portable surface finishing device based on the coherent light source of claim 1, wherein each of the reflective units is a metal reflective coating layer.

8. The portable surface finishing device based on the coherent light source of claim 1, wherein the rotation driving mechanism comprises a DC motor.

9. The portable surface finishing device based on the coherent light source of claim 8, wherein the rotation driving mechanism further comprises:
    a base for the DC motor and the multifaceted reflective structure to be disposed thereon; and
    a bearing disposed around a driving head of the DC motor;
    wherein the driving head is connected to the multifaceted reflective structure.

10. The portable surface finishing device based on the coherent light source of claim 1, wherein the laser source is an optical fiber laser source.

11. The portable surface finishing device based on the coherent light source of claim 1, wherein the cover further comprises:
   a switch electrically connected to the rotation driving mechanism.

12. The portable surface finishing device based on the coherent light source of claim 1, wherein the cover further comprises:
   a knob connected to the rotation driving mechanism, and for controlling a rotational speed of the multifaceted reflective structure driven by the rotation driving mechanism.

13. The portable surface finishing device based on the coherent light source of claim 1, wherein the laser scanning module further comprises:
   a reflector for reflecting the laser beam from the optical calibrating module to the multifaceted reflective structure.

14. The portable surface finishing device based on the coherent light source of claim 1, further comprising:
   a battery module disposed at the cover, and electrically connected to the laser source and the rotation driving mechanism of the laser scanning module.

* * * * *